United States Patent Office 3,277,165
Patented Oct. 4, 1966

3,277,165
FUMARAMIC ACID DERIVATIVES
Everett M. Schultz, Ambler, Pa., assignor to Merck & Co., Inc., Rahway, N.J., a corporation of New Jersey
No Drawing. Filed Feb. 8, 1962, Ser. No. 171,828
The portion of the term of the patent subsequent to Dec. 7, 1982, has been disclaimed
10 Claims. (Cl. 260—518)

This invention comprises novel derivatives of fumaramic acid and in particular those derivatives wherein a hydrogen of the amino group of fumaramic acid is replaced by a phenylethyl radical or by a phenylpropyl radical and more particularly by derivatives wherein the ethylene or propylene chain of the phenylethyl or phenylpropyl substituent is additionally substituted by one or more groups such as by a lower alkyl, phenyl, benzyl, and the like radicals, or is substituted by any combination of these radicals.

The novel compounds of this invention can be considered to be phenylalkylfumaramic acids and include the alkali metal salts thereof as well as simple ester derivatives, such as esters derived from the low molecular weight alcohols. In these compounds the phenyl moiety can be unsubstituted or a hydrogen atom can be replaced by a halogen, particularly chlorine or bromine. The alkyl moiety is a straight chain alkylene radical having at least two and no more than three carbon atoms in the chain connecting the phenyl radical and the nitrogen of the amino group of fumaramic acid; in other words, the alkyl moiety is an ethylene or propylene radical, each valence of the ethylene or propylene radical being satisfied by one of the following: (a) hydrogen, (b) a lower alkyl radical having from 1 to 10 carbon atoms, and preferably having up to 6 carbon atoms in a straight or branched chain or alicyclic, such as a methyl, iso- or normal-propyl, ico- or normal-butyl, amyl, hexyl, cyclopentyl, cyclohexyl, and the like, (c) a mononuclear aryl, either substituted or unsubstituted, as a phenyl or a halophenyl radical, wherein the halogen is attached in ortho, meta, or para-position and is preferably a chloro- or bromo-substituent, a lower alkyl substituted phenyl or a lower alkoxy substituted phenyl, and the like, or (d) a mononuclear aryl-lower alkyl radical such as an unsubstituted or substituted mononuclear aryl-lower alkyl radical wherein, if substituted, the substituent group can be attached in ortho, meta, or para-position of the aryl nucleus and advantageously can be a halogen, particularly chlorine or bromine, a lower alkyl or a lower alkoxy substituent attached preferably to the benzenoid portion of the benzyl radical, for example.

The compounds of this invention possess a variety of properties and are especially useful because they inhibit the excretion of penicillin through the kidney tubules thus providing prolonged blood levels of penicillin. Because of this property the new compounds of this invention are useful as adjuvants for use in conjunction with the administration of penicillin to provide an increase in the blood plasma penicillin concentration with a given dose of penicillin, thereby making possible very high penicillin blood levels, or permitting the use of smaller quantities of penicillin for providing a given blood level, or permitting less frequent administration of penicillin while maintaining a penicillin blood level adequate for bactericidal or bacteriostatic purposes.

Some of the compounds additionally enhance the excretion of uric acid from the body and therefore are useful agents in the treatment of gout or gouty arthritis and in alleviating symptoms of these conditions and of complications associated with gout and gouty arthritis.

Additionally, some of the compounds have been found to inhibit the biosynthesis of cholesterol in liver homogenates in vitro. They have also been found to lower the incidence and severity of atherosclerotic plaques in the thoracic aorta or estrogen-treated chickens which were treated with these compounds as compared with their estrogen-treated controls, and to lower the plasma level of cholesterol in rats which had been challenged with quantities of saturated fats such as lard, known to produce an increased cholesterol blood level in these animals. Accordingly, these compounds also are potentially useful in lowering blood cholesterol levels in humans which is considered an important function of chemotherapeutic agents in the treatment of atherosclerosis.

The phenalkylfumaramic acids or their salts or simple esters can be administered in conventional dosage forms such as in a capsule, pill or tablet either with or without theropeutically inert materials and with or without other therapeutically active substances or in the form of sterile solutions and the like.

While all of the fumaramic acid derivatives of this invention possess one or more of the above properties to varying degrees, the compounds having a phenylethyl radical attached to the amino nitrogen of fumaramic acid, and especially those phenylethylfumaramic acids which also have attached to the ethylene chain a phenyl or a benzyl radical, with or without a halogen substituent on one or both of the benzenoid nuclei, possess one or more of the above described properties to a marked degree.

The fumaramic acid derivatives of this invention are easily prepared by bringing together a solution of the selected phenylalkylamine and a solution of a lower alkyl ester of fumaryl halide and saponifying the fumaramate ester thus formed. The reaction between the ingredients occurs quite readily at room temperature and the fumaramic ester can then be separated by known conventional methods, as by evaporation of the solvent and the like. Benzene has been found to be an effective solvent for the phenylalkylamine as well as for the ester of fumaryl halide although other solvents could be used in its place.

Some of the phenylalkylamines used in preparing the fumaramic acid derivatives of this invention are new compounds which can readily be prepared by one or another of the many well-known methods for preparing phenylalkylamines. By one such method, a carbonyl compound is converted by means of the Leuckart reaction to the desired phenylalkylamine. This reaction involves heating the carbonyl compound (i.e., a ketone or an aldehyde), with formamide and formic acid preferably under reflux conditions to form the formamide derivative of the desired phenylalkylamine. This compound, after hydrolysis with a mineral acid, such as hydrochloric acid, generally is isolated either (a) as an acid addition salt thereof, such as the hydrochloric salt, which may be insoluble in the reaction medium or (b) by treatment of the reaction medium with alkali, such as sodium hydroxide, to obtain the free base, which then is extracted with a solvent, such as ether, and purified by distillation of the base.

Another method which can be employed to prepare the phenylalkylamines involves the hydrogenation of the selected nitrile in the presence of Raney nickel at elevated temperatures and pressures.

Alternatively the selected nitriles can be reacted with a Grignard reagent thus forming the corresponding ketimine, which is reduced in the presence of a noble metal catalyst, such as platinum or paladium and the like, to the corresponding desired phenylalkylamine.

Another method which can be employed to advantage involves reacting the selected ketone with hydroxylamine thus forming the corresponding ketoxime, which then is catalytically hydrogenated, advantageously in the presence of Raney nickel, to form the desired amine.

The above and other methods for preparing the amines and the novel fumaramic acid derivatives of this invention will be described in more detail by the following examples.

The novel fumaramic acid derivatives of this invention, as well as their intermediate phenylalkylamines, which contain one asymmetric carbon atom in the ethylene or propylene radical will be obtained as racemic mixtures which can be separated into the dextrorotatory and levorotatory isomers by known methods.

The novel fumaramic acid derivatives of this invention, as well as the corresponding phenylalkylamines, which contain two asymmetric carbon atoms in the ethylene or propylene radical will be obtained as diasterioisomers. In this specification and in the claims the diasterioisomer having the higher melting point has been designated the α-isomer and that having the lower melting point has been designated the β-isomer. The α-isomer and the β-isomer, of course, also will be obtained as racemic mixtures which can be separated by known methods.

While greater activity may reside in one or another of the α-isomer or β-isomer or in the dextro- or levorotatory antipode of one or another of these isomers, in general, mixtures of their racemates can be employed for one or another of the uses identified above for which the individual compound may possess the desired property.

The preparation of the novel fumaramic acid derivatives of this invention is illustrated by the following examples. It is to be understood, of course, that these examples are illustrative and not limitative of the compounds of this invention and of the methods by which they can be prepared. The examples also illustrate methods for preparing suitable dosage forms of the fumaramic acid derivatives of this invention.

*Example 1.—N-(1-methyl-2,3-di-p-chlorophenylpropyl)-fumaramic acid*

*Step A.*—p-Chlorophenylacetone (141.6 g., 0.84 mole), prepared from p-chlorobenzaldehyde and nitroethane by the method described by F. W. Hoover and H. B. Hass [J. Org. Chem. 12, 501 (1947)], is alkylated with p-chlorobenzyl chloride (161 g., 1.0 mole) in the presence of granulated sodium hydroxide (36.8 g., 0.92 mole) by substantially the same method described by E. M. Schultz, J. B. Bicking, S. Mickey, and F. S. Crossley [J. Amer. Chem. Soc. 75:1072 (1953)]. The boiling point of the thus obtained 3,4-di-p-chlorophenyl-2-butanone is 177° C. (0.75 mm.) and it is obtained in 64% yield. A small portion of the product thus obtained is converted, for analytical purposes, to the 2,4-dinitrophenyl hydrazone of 3,4-di-p-chlorophenyl-2-butanone, M.P. 154–155° C., by the method described in the textbook entitled "Identification of Organic Compounds," Shriner and Fuson, 2nd Edition, John Wiley & Son, page 143.

*Analysis.*—Calculated for $C_{22}H_{18}Cl_2N_4O_4$: C, 55.82; H, 3.83; Cl 14.98. Found: C, 56.16; H, 3.87; Cl, 15.01.

*Step B.*—The above ketone was submitted to the Leuckart reaction in the following manner: 3,4-di-p-chlorophenyl-2-butanone (135 g.) and formamide (84 g.) is heated under reflux at 170° C. for 14 hours. Formic acid (about 35 ml.) is added in small portions from time to time to keep the vapors above the reaction mixture acidic to alkacid indicator paper. The reaction mixture then is permitted to cool and is extracted with benzene. The benzene layer is separated and the benzene evaporated. The residue is boiled with 65 ml. concentrated hydrochloric acid for eight hours thus forming the two diastereoisomers of 3,4-di-p-chlorophenyl-2-aminobutane hydrochloride in a yield of 70%.

The α- and β-isomers are separated as described in Steps C and D; the higher melting isomer is designated as the α-form and the lower melting isomer is designated as the β-form.

*Step C.*—The mixture of the two diastereoisomers, obtained as described in Step B above, is added to 300 ml. of water and heated for ½ hour at 80° C. While still hot, the aqueous layer is separated by decantation and discarded. The remaining solid material is added to 300 ml. of water, heated to boiling, and filtered while still hot, yielding a solid material (1) and a clear filtrate (2). The filtrate is cooled to 20° C. and filtered yielding a solid (3) and an oily aqueous filtrate (4).

The solid (3) remaining on the filter is washed with water and the washing (3a) is added to the oily aqueous filtrate (4) and set aside for use in Step D.

Solids (1) and (3) are each dried at 55° C. and combined. The combined solids (1) and (3) then are crystallized from water (300 ml.) and isopropyl alcohol (110 ml.) yielding 29 g. of the α-isomer of 3,4-di-p-chlorophenyl-2-aminobutane hydrochloride which begins to char at 265° C. but has no definite melting point.

*Step D.*—To the mixture of the oily aqueous filtrate (4) and washing (3a), obtained in Step C, sufficient water is added to dissolve the oil. The aqueous solution then is extracted with ether and the ether layer separated and discarded. The remaining aqueous solution is made basic with 20% sodium hydroxide, extracted again with ether, and the aqueous layer discarded. The remaining ether solution then is dried over potassium carbonate, acidified with 6 N ethanolic hydrogen chloride and cooled to 5° C. whereupon the β-isomer precipitates and is removed by filtration. The B-isomer of 3,4-di-p-chlorophenyl-2-aminobutane hydrochloride thus obtained melts at 184–186° C., yield 65 g.

*Step E.*—The α-isomer of 3,4-di-p-chlorophenyl-2-amino-butane hydrochloride (10 g., 0.03 mole), obtained as described in Step C above, is suspended in water (140 ml.) in a separatory funnel. Excess 20% sodium hydroxide is added and the free base is extracted with ether and the ether solution is dried over potassium carbonate and concentrated to an oily residue. This residue dissolves in 45 ml. of benzene and the solution is added to a solution of ethyl fumaryl chloride (4.88 g., 0.03 mole) in 10 ml. of benzene. After several minutes triethylamine (3.5 ml.) is added and the solution is stirred for 1 hour at 25° C. The benzene solution is extracted with dilute hydrochloric acid, sodium bicarbonate solution and then water. The benzene solution is dried and concentrated to a residue which is crystallized from a mixture of benzene and petroleum ether to give a 54% yield of the α-isomer of ethyl N-(1-methyl-2,3-di-p-chlorophenylpropyl)-fumaramate, M.P. 112–115° C.

*Analysis.*—Calculated for $C_{22}H_{23}Cl_2NO_3$: C, 62.86; H, 5.52; N, 3.33. Found: C, 62.82; H, 5.80; N, 3.27.

*Step F.*—Ethyl N - (1 - methyl-2,3-di-p-chlorophenylpropyl)-fumaramate (19.8 g., 0.047 mole) prepared as described in Step E is dissolved in methyl alcohol (50 ml.), a solution of potassium hydroxide (2.77 g., 0.049 mole) in water (5.5 ml.) is added and the reaction mixture is allowed to stand 18 hours at 25° C. The methanol is removed under reduced pressure and the residual oil is dissolved in water. The cloudy solution is extracted with ether and the aqueous phase is acidified with hydrochloric acid. The resulting oil is extracted with ether and the ethereal extract is concentrated to a glassy solid. The solid α-isomer of N-(1-methyl-2,3-di-p-chlorophenylpropyl)-fumaramic acid crystallizes when treated with benzene and after recrystallization from chloroform, 71% yield of product is obtained, M.P. 101–109° C.

*Analysis.*—Calculated for $C_{20}H_{19}Cl_2NO_3$: C, 61.23; H, 4.88; N, 3.57. Found: C, 61.33; H, 5.11; N, 3.45.

*Step G.*—By replacing the α-isomer employed in Step E by an equimolecular quantity of the β-isomer of 3,4-di-p-chlorophenylaminobutane hydrochloride, obtained in Step D, and following substantially the same procedure described in Step E, there is obtained the β-isomer of ethyl N - (1-methyl-2,3-di-p-chlorophenylpropyl)-fumaramate.

Step H.—The ester obtained in Step G is saponified by substantially the same method described in Step F to give the β-isomer of N-(1-methyl-2,3-di-p-chlorophenylpropyl)-fumaramic acid.

*Example 2.—N-(1-methyl-2-p-chlorophenyl-3-phenylpropyl)-fumaramic acid*

Step A.—p-Chlorophenylacetone (45 g., 0.27 mole), prepared as described in Example 1, is alkylated with benzyl chloride (44 g., 0.3 mole) by the method described in Example 1, Step A, yielding 47.6 g. of 3-p-chlorophenyl-4-phenyl-2-butanone melting at 77–80° C. An analytical sample, crystallized from isopropyl alcohol, melts at 80–81° C.

Analysis.—Calculated for $C_{16}H_{15}ClO$: C. 74.28; H, 5.75. Found: C, 74.02; H, 5.75.

Step B.—The ketone obtained as described in Step A above, (80 g.), is submitted to a Leuckart reaction in substantially the same manner described in Example 1, Step B yielding a mixture of the α- and β-isomers of 3-p-chlorophenyl-4-phenyl-2-aminobutane hydrochloride.

Step C.—The mixture of diastereoisomers obtained as described in Step B above, is added to water (250 ml.) with stirring. There is obtained a mixture (2) comprising a clear supernatant and a precipitate of purple oil. The mixture (2) is extracted with ether as the purple oil, the hydrochloride of the α- and β-isomers of 3-p-chlorophenyl-4-phenyl-2-aminobutane possesses the unusual property ether solubility. There is obtained an ether solution of the amine hydrochloride (3) and an acidic aqueous layer (4). The aqueous layer (4) is discarded and the ether solution (3) is extracted 30 times with 250 ml. portions of water to obtain water extracts (5). Each 250 ml. portion of (5) is neutralized as soon as obtained by the addition of 20% sodium hydroxide and then extracted with two separate 250 ml. portions of ether (6) which are used over and over again on each individual portion of (5). The two ether extracts (6) which are thus finally obtained are combined and dried over potassium carbonate and then acidified by the addition of alcoholic hydrogen chloride. After chilling for 16 hours, a solid (7) precipitates and is collected by filtration yielding 7 g. of product (7a), M.P. 234–241° C. The filtrate (8) is reserved for use in Step D below as it contains the β-isomer. After crystallization of product (7a) from water, there is obtained 4.8 g. of the α-isomer of 3-p-chlorophenyl - 4 - phenyl-2-aminobutane hydrochloride, which decomposes slowly at 240–250° C.

Analysis.—Calculated for $C_{16}H_{18}ClN \cdot HCl$: C. 64.87; H, 6.46; N, 4.73. Found: C, 65.20; H, 6.50; N, 4.71.

Step D.—The ether filtrate (8) obtained as described in Step C above, is evaporated to dryness yielding 51.7 g. of solid (9), M.P. 188–195° C. The solid (9) is crystallized from a mixture of benzene (175 ml.) and hexane (125 ml.) yielding 39 g. of solid (10), M.P. 194–196° C. Crystallization of (10) from a mixture of benzene (138 ml.) and hexane (98 ml.) yields 20.1 g. of solid (11), the β-isomer of 3-p-chlorophenyl-4-phenyl-2-aminobutane hydrochloride, M.P. 195–197° C. One gram of product is crystallized two more times from a mixture of benzene-hexane yielding an analytical sample melting at 196–198° C.

Analysis.—Calculated for $C_{16}H_{18}ClN \cdot HCl$: C, 64.87; H, 6.46; N, 4.73. Found: C, 64.63; H, 6.46; N, 4.70.

Step E.—The α-isomer of 3-p-chlorophenyl-4-phenyl-2-aminobutane hydrochloride (4.1 g., 0.0138 mole), obtained as described in Step C is converted to the free base and reacted with ethyl fumaryl chloride by substantially the same procedure described in Example 1, Step E, to give the α-isomer of ethyl N-(1-methyl-2-p-chlorophenyl-3-phenylpropyl)-fumaramate.

Step F.—By replacing the α-isomer ethyl N-(1-methyl-2,3-di-p-chlorophenylpropyl)-fumaramate used in Step F of Example 1 by an equimolecular quantity of the α-isomer of ethyl N-(1-methyl-2-p-chlorophenyl-3-phenylpropyl)-fumaramate and following substantially the same procedure described in Step F of Example 1, there is obtained the α-isomer of N-(1-methyl-2-p-chlorophenyl-3-phenylpropyl)-fumaramic acid.

Step G.—By replacing the α-isomer employed in Step E of Example 1 by an equimolecular quantity of the B-isomer of 3-p-chlorophenyl-4-phenyl-2-aminobutane hydrochloride obtained in Step D, and following substantially the same procedure described in Step E of Example 1 there is obtained the β-isomer of ethyl N-(1-methyl-2-p-chlorophenyl-3-phenylpropyl)-fumaramate.

Step H.—The ester obtained in Step G is saponified by substantially the same method described in Example 1, Step F, to give the β-isomer of N-(1-methyl-2-p-chlorophenyl-3-phenylpropyl)-fumaramic acid.

*Example 3.—N-(1-methyl-3-p-chlorophenyl-2-phenylpropyl)-fumaramic acid*

Step A.—1-phenyl-2-propanone is alkylated with p-chlorobenzyl chloride in the presence of sodium hydroxide by substantially the same method described in Example 1, Step A, using equimolecular quantities of reactants to obtain 4 - p - chlorophenyl - 3-phenyl-2-butanone, B.P. 148–151° C. (0.3 mm.). After crystallization from ethanol, a crystalline product is obtained, M.P. 78–79° C., yield about 44%.

Analysis.—Calculated for $C_{16}H_{15}ClO$: C, 74.28; H, 5.84. Found: C, 74.42; H, 5.83.

Step B.—The 4 - p - chlorophenyl-3-phenyl-2-butanone (113 g., 0.435 mole) is submitted to a Leuckart reaction in substantially the same manner described in Example 1, Step B. The reaction mixture from the hydrolysis of the formamide compound then is added to water and the solid material (1) which does not dissolve is collected by filtration, washed with water, and air dried. The filtrate and washing are combined forming mixture (2) which contains the β-isomer, and is set aside for use in Step C below. The solid (1) is crystallized from water yielding the α-isomer of 4-p-chlorophenyl-3-phenyl-2-aminobutane hydrochloride, M.P. 290–292° C.

Analysis.—Calculated for $C_{16}H_{18}ClN \cdot HCl$: C, 64.87; H, 6.46; Cl, 23.94; N, 4.73. Found: C, 64.93; H, 6.56; Cl, 23.94; N, 4.70.

Step C.—The mixture (2), obtained as described in Step B above, is extracted with ether and made basic by the addition of 20% sodium hydroxide. The base which separates is extracted with ether and the ether extract then dried over potassium carbonate and acidified with alcoholic hydrogen chloride. The precipitate is collected by filtration and crystallized from isopropyl alcohol yielding the β-isomer of 4-p-chlorophenyl-3-phenyl-2-aminobutane hydrochloride, M.P. 179–180° C.

Analysis.—Calculated for $C_{16}H_{18}ClN \cdot HCl$: C, 64.87; H, 6.46; Cl, 23.94; N, 4.73. Found: C, 64.92; H, 6.56; Cl, 24.11; N, 4.76.

Step D.—The α-isomer of 4-p-chlorophenyl-3-phenyl-2-aminobutane hydrochloride (8.4 g., 0.028 mole), obtained as described in Step B is converted to the free base and reacted with ethyl fumaryl chloride by substantially the same method described in Example 1, Step F, using equivalent quantities of reactants, to give the α-isomer of ethyl N - (1 - methyl-3-p-chlorophenyl-2-phenylpropyl)-fumaramate.

Step E.—By replacing the α-isomer ethyl N-(1-methyl-2,3-di-p-chlorophenylpropyl)-fumaramate used in Step F of Example 1 by an equimolecular quantity of the α-isomer of ethyl N-(1-methyl-3-p-chlorophenyl-2-phenylpropyl)-fumaramate and following substantially the same procedure described in Step F of Example 1, there is obtained the α-isomer of N-(1-methyl-3-p-chlorophenyl-2-phenylpropyl)-fumaramic acid.

Step F.—By replacing the α-isomer employed in Step E of Example 1 by an equimolecular quantity of the β-isomer of 4-p-chlorophenyl-3-phenyl-2-aminobutane hydrochloride obtained in Step D, and following substantially the same procedure described in Step E of Example 1 there is obtained the β-isomer of ethyl N-(1-methyl-3-p-chlorophenyl-2-phenylpropyl)-fumaramate.

Step G.—The ester obtained in Step G is saponified by substantially the same method described in Example 1, Step F, to give the β-isomer of N-(1-methyl-3-p-chlorophenyl-2-phenylpropyl)-fumaramic acid.

*Example 4.—N-(1-methyl-2,3-di-o-bromophenyl-propyl)-fumaramic acid*

By replacing the 1-phenyl-2-propanone and the p-chlorobenzyl chloride employed in Example 4, Step A, by an equimolecular quantity of 1-(o-bromophenyl)-2-propanone and o-bromobenzyl chloride and following substantially the same procedures described in Example 4, Steps A through F. There are obtained the α-isomer and the B-isomer of N-(1-methyl-2,3-di-o-bromophenylpropyl)-fumaramic acid.

*Example 5.—N-(1-methyl-3-o-bromophenyl-2-m-chlorophenyl)-fumaramic Acid*

Step A.—m-Chlorophenylacetone prepared by the method described in Example 1, Step A, from m-chlorobenzaldehyde is alkylated with o-bromobenzyl chloride by the method described in Example 1, Step A, yielding 4-o-bromophenyl-3-m-chlorophenyl-2-butanone.

Step B.—The thus obtained ketone then is converted by the procedures described in Example 3, Steps B through D, to the α-isomers and the β-isomer of 4-o-bromophenyl-3-m-chlorophenyl-2-aminobutane hydrochloride. Each of these isomers is converted by the procedures described in Eaxmples 3, Steps E through H, to the corresponding a- and β- of N-(1-methyl-3-o-bromophenyl-2-m-chlorophenylpropyl)fumaric acid.

*Example 6.—N-(1-methyl-2,3-diphenylpropyl)-fumaramic Acid.*

Step A.—3,4-diphenyl-2-butanone (135 g., 0.6 mole) is converted by the Leuckart reaction in substantially the same manner described in Example 1, Step B, to 3,4-diphenyl-2-aminobutane hydrochloride. The hydrochloride salt is converted to the free base by substantially the same process described in Example 1, Step E, yielding 87 g. of the base, B.P. 120–122° C. (0.5 mm.).

Step B.—The 3,4-diphenyl-2-aminobutane, obtained as described in Step A, (137 f.) is suspended in water (200 ml.) and concentrated hydrochloric acid added slowly at 15° C. until a lasting precipitate is formed. The mixture is heated to 80° C. to dissolve the precipitate and then allowed to cool slowly to 20° C. A solid (2) separates and is collected by filtration yielding 51 grams of the α-isomer, melting point 210–228° C. The filtrate (3) is set aside for treatment as described in Step D below to isolate the β-isomer. The solid (2) is crystallized from water yielding 32 g. of the α-isomer of 3,4-diphenyl-2-aminobutane hydrochloride, M.P. 247–248° C.

Analysis.—Calculated for $C_{16}H_{19}N \cdot HCl$: Cl, 13.55; N, 5.35; Found: Cl, 13.56; N, 5.33.

Step C.—The α-isomer of 3,4-diphenyl-2-aminobutane hydrochloride (7.84 g., 0.03 mole), obtained as described in Step B, above, is converted to an ether solution (30 ml.) of the base in substantially the same manner described in Example 1, Step E. The ether is removed and the residual product is reacted with ethyl fumaryl chloride by substantially the same method described in Example 1, Step F, using equivalent quantities of reactants, to give the α-isomer of ethyl N-(1-methyl-2,3-diphenylpropyl)-fumaramate.

Step D.—By replacing the α-isomer ethyl N-(1-methyl-2,3-di-p-chlorophenylpropyl)-fumaramate used in Step F of Example 1 by an equimolecular quantity of the α-isomer of ethyl N-(1-methyl-2,3-diphenylpropyl)-fumaramate and following substantially the same procedure described in Step F of Example 1, there is obtained the α-isomer of N-(1-methyl-2,3-diphenyl-propyl)-fumaramic acid.

Step E.—The filtrate (3) obtained as described in Step B above, is cooled to 20° C. and concentrated hydrochoric acid (about 20 ml.) is added until a lasting precipitate is formed. The mixture is heated to 80° C. to dissolve the precipitate and then allowed to cool to 20° C. The solid (5) (68 g.) which separates is collected by filtration and the filtrate (6) is cooled to 5° C. A second crop of solid (7) (33 g.) separates and is collected by filtration. The filtrate (8) is discarded. The solids (5) and (7) are combined and crystallized from isopropyl alcohol yielding 71 g. of the β-isomer of 3,4-diphenyl-2-aminobutane hydrochloride. For analysis, 4 g. of the compound thus obtained is crysallized four additional times from isopropyl alcohol yielding 1.6 g. of the β-isomer of 3,4-diphenyl-2-aminobutane hydrochloride, M.P. 161–162° C.

Analysis.—Calculated $C_{16}H_{19}N \cdot HCl$: C, 73.40; H, 7.70; N, 5.35. Found: C, 73.28; H, 7.68; N. 5.31.

Step F.—By replacing the α-isomer employed in Step E of Example 1 by an equimolecular quantity of β-isomer of 3,4-diphenyl-2-aminobutane hydrochloride obtained in Step D, and following substantially the same procedure described in Step E of Example 1, there is obtained the β-isomer of ethyl N-(1-methyl-2-3-diphenylpropyl)-fumaramate.

Step G.—The ester obtained in Step F is saponified by substantially the same method described in Example 1, Step F, to give the β-isomer of N-(1-methyl-2,3-diphenyl-propyl)-fumaramic acid.

*Example 7.—N-(2-3-diphenylpropyl)-fumaramic acid*

Step A.—By replacing the β-isomer employed in Step E of Example 1 by an equimolecular quantity of 2,3-diphenyl-1-amino-propane hydrochloride, and following substantially the same procedure described in Step E of Example 1, there is obtained the ethyl ester of N-(2,3-diphenylpropyl)-fumaramic acid.

Step B.—The ester obtained above is saponified by substantially the same method described in Example 1, Step F, to give N-(2,3-diphenylpropyl)-fumaramic acid.

*Example 8.—N-(1-methyl-2,2-diphenylpropyl)-fumaramic acid*

Step A.—By replacing the free base of the α-isomer employed in Step E of Example 1 by an equimolecular quantity of 3,3-diphenyl-2-aminobutane, and following substantially the same procedure described in Step E of Example 1 there is obtained the ethyl ester of N-(1-methyl-2,2-diphenylpropyl)-fumaramic acid.

Step B.—The ester obtained above is saponified by substantially the same method described in Example 1, Step F, to give N-(1-methyl-2,2-diphenylpropyl)-fumaramic acid.

*Example 9.—N-(2,2-diphenyl-3-methylbutyl)-fumaramic acid*

Step A.—α,α-diphenyl-β-methylbutyronitrile is added to absolute ethanol in a stainless steel-lined rocking pressure vessel. Raney nickel is added and the nitrole hydrogenated at 150° C. under an initial hydrogen pressure of 1,100 p.s.i. yielding 2,2-diphenyl-3-methyl-1-aminobutane (79% yield) B.P. 153–158° C. (8 mm.). The hydrobromide addition salt, M.P. 207–209° C., was prepared in the usual manner.

Analysis.—Calculated for $C_{17}H_{21}N \cdot HBr$: N, 4.37. Found: N. 4.26.

Step B.—By replacing the free base of the α-isomer employed in Step E of Example 1 by an equimolecular quantity of 2,2-diphenyl-3-methyl-1-aminobutane, and following substantially the same procedure described in Step E of Example 1 there is obtained ethyl N-(2,2-diphenyl-3-methylbutyl)-fumaramate.

*Step C.*—The ester obtained above is saponified by substantially the same method described in Example 1, Step F, to give N-(2,2-diphenyl-3-methylbutyl)-fumaramic acid.

Example 10.—N-(1-methyl-2-benzyl-3-phenylpropyl)-fumaramic acid

*Step A.*—1-phenyl-2-benzyl-3-butanone is converted by the Leuckart reaction in substantially the same manner described in Example 1, Step B, to 1-phenyl-2-benzyl-3-aminobutane hydrochloride. The hydrochloride salt is converted to the free base by substantially the same procedure described in Example 1, Step E, B.P. 193–198° C. (15 mm.).

*Step B.*—By replacing the free base of the α-isomer employed in Step E of Example 1 by an equimolecular quantity of 1-phenyl-2-benzyl-3-aminobutane, and following substantially the same procedure described in Step E of Example 1 there is obtained ethyl N-(1-methyl-2-benzyl-3-phenylpropyl)-fumaramate.

*Step C.*—The ester obtained above is saponified by substantially the same method described in Example 1, Step F, to give N-(1-methyl-2-benzyl-3-phenylpropyl)-fumaramic acid.

Example 11.—N-(1-n-propyl-3-phenylpropyl)-fumaramic acid

*Step A.*—1-phenyl-3-hexanone (26.7 g., 0.15 mole) is submitted to a Leuckart reaction in substantially the same manner described in Example 1, Step B, yielding 15 g. of 1-phenyl-3-aminohexane hydrochloride. The hydrochloride salt is converted to the free base by substantially the same procedure described in Example 1, Step E, B.P. 142° C. (25 mm.).

*Step B.*—By replacing the free base of the α-isomer employed in Step E of Example 1 by an equimolecular quantity of 1-phenyl-3-aminohexane, and following substantially the same procedure described in Step E of Example 1 there is obtained ethyl N-(1-n-propyl-3-phenylpropyl)-fumaramate.

*Step C.*—The ester obtained above is saponified by substantially the same method described in Example 1, Step F, to give N-(1-n-propyl-3-phenylpropyl)-fumaramic acid.

Example 12.—N-(1,3-diphenylpropyl)-fumaramic acid

*Step A.*—By replacing the α-isomer employed in Step E of Example 1 by an equimolecular quantity of 1,3-diphenyl-1-aminopropane hydrochloride, and following substantially the same procedure described in Step E of Example 1 there is obtained ethyl N-(1,3-diphenylpropyl)-fumaramate.

*Step B.*—The ester obtained above is saponified by substantially the same method described in Example 1, Step F, to give N-(1,3-diphenylpropyl)-fumaramic acid.

Example 13.—N-(1-methyl-2,2,3-triphenylpropyl)-fumaramic acid

*Step A.*—Sodium acetate trihydrate (6.8 g., 0.05 mole) and hydroxylamine hydrochloride (6.9 g., 0.1 mole) are dissolved in water (18 ml.) and 3,3,4-triphenyl-2-butanone (15.0 g., 0.05 mole) in methanol (100 ml.) is added. The mixture is boiled for two hours after which the alcohol is removed by distillation. On cooling and addition of water, a precipitate is formed. The water is decanted and extracted with ether. The ether layer is removed and used to dissolve the precipitate, then washed with water, the water-washed ether solution dried over sodium sulfate and the ether evaporated. The residue is crystallized from cyclohexane to give 10.1 g. (64%) of 3,3,4-triphenyl-2-butanone oxime, M.P. 118–122° C.

After purification by recrystallization from cyclohexane and drying at 80° C. in vacuo the oxime melts at 151–153° C.

*Analysis.*—Calculated for $C_{22}H_{21}NO$: C, 83.77; H, 6.71. Found: C, 83.12; H, 6.74.

*Step B.*—The ketoxime from Step A (10.0 g.) is added to absolute ethanol (30 ml.) in a rocking, stainless steel-lined pressure vessel. Raney nickel (2 g.) is added and the ketoxime hydrogenated at 80° C. under an initial hydrogen pressure of 800 pounds per square inch during a period of one half hour. After removal of the alcohol and catalyst from the cooled solution, a residue of 3,3,4-triphenyl-2-aminobutane (7.7 g.) remains as a viscous oil which slowly crystallizes.

*Step C.*—By replacing the free base of the α-isomer employed in Step E of Example 1 by an equimolecular quantity of 3,3,4-triphenyl-2-aminobutane, and following substantially the same procedure described in Step E of Example 1, there is obtained ethyl N-(1-methyl-2,2,3-triphenylpropyl)-fumaramate.

*Step D.*—The ester obtained above is saponified by substantially the same method described in Example 1, Step F, to give N-(1-methyl-2,2,3-triphenylpropyl)-fumaramic acid.

Example 14.—N-(2-phenylethyl)-fumaramic acid

Fumaryl chloride (4.5 g., 0.03 mole) is dissolved in ether (100 ml.) and sodium bicarbonate (4.5 g., 0.05 mole) is added. 2-phenylethylamine (3.63 g., 0.03 mole) in ether (20 ml.) then is added dropwise with stirring and the mixture kept at 25–30° C. for 16 hours. The solid material that forms is collected by filtration and added to a dilute solution of sodium hydroxide, stirred well and the resulting solution filtered and acidified with hydrochloric acid. A solid, M.P. 195–198° C. (1.2 g.) separates and after crystallizing from a mixture of water and isopropyl alcohol, gives 0.7 g. off N-(2-phenylethyl)-fumaramic acid, M.P. 200–201° C.

*Analysis.*—Calculated for $C_{12}H_{13}NO_3$: C, 65.74; H, 5.98; N, 6.39. Found: C, 65.77; H, 6.04; N, 637.

While the above examples describe the preparation of certain illustrative compounds falling within the scope of the discovery hereinbefore described, it is to be understood that the invention is not to be limited by or to these examples, nor by the specific reaction conditions described for the preparation of the compounds, but is to be understood to embrace modifications and variations falling within the scope of the appended claims.

What is claimed is:

1. Phenyl-R-fumaramic acid wherein R is an alkylene radical having two to three carbon atoms in a straight chain between the phenyl radical and the nitrogen atom of the fumaramic acid residue each remaining valence of said alkylene radical being satisfied by a radical selected from the class consisting of hydrogen, lower alkyl, phenyl, chloro-phenyl, bromo-phenyl, benzyl, chloro-benzyl and bromo-benzyl.

2. (Halo-phenyl)-R-fumaramic acid wherein R is an alkylene radical having two carbon atoms in a straight chain between the phenyl radical and the nitrogen atom of the fumaramic acid residue, each remaining valence of said alkylene radical being satisfied by only two hydrogen atoms, a lower alkyl, and a halobenzyl radical the halo radical in each instance is selected from the group consisting of chloro and bromo.

3. N - [1 - lower alkyl-2,3-di-(chlorophenyl)propyl]-fumaramic acid.

4. N - (1-methyl-2,3-di-p-chlorophenylpropyl)-fumaramic acid.

5. N - (1-lower alkyl-2,-chlorophenyl-3-phenylpropyl)-fumaramic acid.

6. N - (1 - methyl-2-p-chlorophenyl-3-phenylpropyl)-fumaramic acid.

7. N - (1-lower alkyl-2-phenyl-3-chlorophenylpropyl)-fumaramic acid.

8. N-(1-methyl-2-phenyl-3-p-chlorophenylpropyl)-fumaramic acid.

9. N-(1-methyl-2,3-diphenylpropyl)-fumaramic acid.

10. N-(1-methyl-2,2,3-triphenylpropyl)-fumaramic acid.

References Cited by the Examiner

UNITED STATES PATENTS 3,018,292  1/1962  Sauers et al. _____ 260—518

OTHER REFERENCES

Maffei et al.: Chem. Abstracts, 54, 16457 (1960).
Wagner et al.: Syn. Org. Chem., p. 566 (1953).

LEON ZITVER, *Primary Examiner.*

CHARLES B. PARKER, *Examiner.*

D. D. HORWITZ, G. D'ANGELO, B. HELFIN,
*Assistant Examiners.*